United States Patent
Harada (10) Patent No.: US 11,124,236 B2
(45) Date of Patent: Sep. 21, 2021

(54) DRIVE ASSIST APPARATUS

(71) Applicant: Honda Motor Co., Ltd., Tokyo (JP)

(72) Inventor: Toshiyuki Harada, Wako (JP)

(73) Assignee: Honda Motor Co., Ltd.

( * ) Notice: Subject to any disclaimer, the term of this patent is extended or adjusted under 35 U.S.C. 154(b) by 149 days.

(21) Appl. No.: 15/896,975

(22) Filed: Feb. 14, 2018

(65) Prior Publication Data

US 2018/0257708 A1 Sep. 13, 2018

(30) Foreign Application Priority Data

Mar. 7, 2017 (JP) .............................. JP2017-042745

(51) Int. Cl.
*B62D 15/02* (2006.01)
*G05D 1/02* (2020.01)

(52) U.S. Cl.
CPC ......... *B62D 15/025* (2013.01); *B60Y 2200/11* (2013.01); *B60Y 2300/12* (2013.01); *B60Y 2302/03* (2013.01); *B60Y 2400/83* (2013.01); *G05D 1/0246* (2013.01); *G05D 1/0257* (2013.01)

(58) Field of Classification Search
CPC ..... B60W 2050/143; B60W 2050/146; B60W 50/14; B60W 30/00; B62D 15/025
See application file for complete search history.

(56) References Cited

U.S. PATENT DOCUMENTS

| | | | | |
|---|---|---|---|---|
| 7,015,799 B1 * | 3/2006 | Kitano | ...................... | B60R 7/04 180/89.11 |
| 9,919,716 B2 * | 3/2018 | Christensen | ...... | B60W 50/0097 |
| 10,266,180 B1 * | 4/2019 | Fields | .................. | A61B 5/6893 |
| 2002/0087255 A1 * | 7/2002 | Jindo | .................. | B62D 15/026 701/96 |
| 2002/0145512 A1 * | 10/2002 | Sleichter, III | ............ | B60N 2/56 340/407.1 |

(Continued)

FOREIGN PATENT DOCUMENTS

| | | |
|---|---|---|
| JP | 2008201311 A | 9/2008 |
| JP | 2012252497 A | 12/2012 |

(Continued)

OTHER PUBLICATIONS

Volvo, 2016 Volvo XC90 Owners Manual (Year: 2015).*

*Primary Examiner* — Hunter B Lonsberry
*Assistant Examiner* — Matthew J. Reda
(74) *Attorney, Agent, or Firm* — Duft & Bornsen, PC (57) ABSTRACT

A drive assist apparatus, including a lane-keeping assist apparatus configured to apply an auxiliary steering torque to a steering mechanism mounted on a vehicle so that the vehicle runs at a predetermined position between lane lines, an operating member configured to be operated by an operator of the vehicle to output an activation signal for activating the lane-keeping assist apparatus, a determining unit configured to determine whether operation of the lane-keeping assist apparatus is necessary, and an outputting unit configured to output at least one of a notify signal for prompting the operator to operate the operating member and the activation signal, when the operating member is inoperative and it is determined that operation of the lane-keeping assist apparatus is necessary by the determining unit.

17 Claims, 6 Drawing Sheets

(56) References Cited

U.S. PATENT DOCUMENTS

| | | | | |
|---|---|---|---|---|
| 2009/0268022 | A1* | 10/2009 | Omi | A61B 5/18 |
| | | | | 348/135 |
| 2013/0184926 | A1* | 7/2013 | Spero | B60W 30/18163 |
| | | | | 701/26 |
| 2013/0253767 | A1* | 9/2013 | Lee | B60W 50/04 |
| | | | | 701/42 |
| 2017/0158226 | A1* | 6/2017 | Lee | B62D 6/005 |
| 2018/0186372 | A1* | 7/2018 | Shimizu | B62D 6/00 |
| 2018/0201318 | A1* | 7/2018 | Kataoka | B62D 5/0463 |
| 2019/0054919 | A1* | 2/2019 | Noto | G05D 1/0061 |

FOREIGN PATENT DOCUMENTS

| | | |
|---|---|---|
| JP | 2013196633 A | 9/2013 |
| JP | 2015005127 A | 1/2015 |
| JP | 2017013527 A | 1/2017 |
| WO | 2016157814 A1 | 10/2016 |

* cited by examiner

DRIVE ASSIST APPARATUS

CROSS-REFERENCE TO RELATED APPLICATION

This application is based upon and claims the benefit of priority from Japanese Patent Application No. 2017-042745 filed on Mar. 7, 2017, the content of which is incorporated herein by reference.

BACKGROUND OF THE INVENTION

Field of the Invention

This invention relates to a drive assist apparatus which has lane-keeping assist functions.

Description of the Related Art

Apparatuses (lane-keeping assist apparatuses) are known that detect current running position of a vehicle (subject vehicle) and, based on the detected running position, apply auxiliary steering torque to a steering actuator so as to run the subject vehicle at a predetermined running position. For example, the apparatus taught by Japanese Unexamined Patent Publication No. 2008-201311 (JP2008-201311A) activates a lane-keeping assist apparatus when an operator turns on a lane-keeping switch, whereupon auxiliary steering torque is controlled so that the subject vehicle runs near the middle of a drive lane.

As in the case of the apparatus described in JP2008-201311A, a lane-keeping assist apparatus generally activates upon operation of a switch by a vehicle operator. Therefore, unless the operator operates the switch, optimum driving assistance cannot be easily performed even under circumstances where operation of the lane-keeping assist apparatus is advisable.

SUMMARY OF THE INVENTION

An aspect of the present invention is a drive assist apparatus having a lane-keeping assist apparatus configured to apply an auxiliary steering torque to a steering mechanism mounted on a vehicle so that the vehicle runs at a predetermined position between lane lines, including: an operating member configured to be operated by an operator of the vehicle to output an activation signal for activating the lane-keeping assist apparatus; and a CPU and a memory coupled to the CPU, wherein the CPU and the memory are configured to perform determining whether operation of the lane-keeping assist apparatus is necessary, and outputting at least one of a notify signal for prompting the operator to operate the operating member and the activation signal, when the operating member is inoperative and it is determined that operation of the lane-keeping assist apparatus is necessary.

Another aspect of the present invention is a drive assist apparatus, including: a lane-keeping assist apparatus configured to apply an auxiliary steering torque to a steering mechanism mounted on a vehicle so that the vehicle runs at a predetermined position between lane lines; an operating member configured to be operated by an operator of the vehicle to output an activation signal for activating the lane-keeping assist apparatus; a determining unit configured to determine whether operation of the lane-keeping assist apparatus is necessary; and an outputting unit configured to output at least one of a notify signal for prompting the operator to operate the operating member and the activation signal, when the operating member is inoperative and it is determined that operation of the lane-keeping assist apparatus is necessary by the determining unit.

Further aspect of the present invention is a drive assist method for assisting driving of a vehicle having a lane-keeping assist apparatus configured to apply an auxiliary steering torque to a steering mechanism mounted on the vehicle so that the vehicle runs at a predetermined position between lane lines, the vehicle further having an operating member configured to be operated by an operator of the vehicle to output an activation signal for activating the lane-keeping assist apparatus, wherein the method including: determining whether operation of the lane-keeping assist apparatus is necessary; and outputting at least one of a notify signal for prompting the operator to operate the operating member and the activation signal, when the operating member is inoperative and it is determined that operation of the lane-keeping assist apparatus is necessary.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
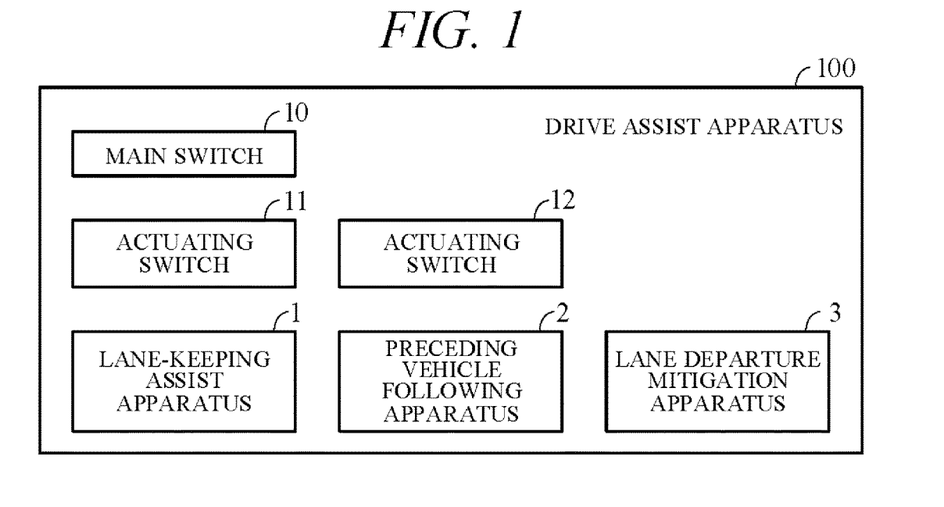
FIG. 1 is a diagram showing a configuration overview of a drive assist apparatus according to an embodiment of the present invention.

An embodiment of the present invention is explained in the following with reference to FIGS. 1 to 8. FIG. 1 is a diagram showing a configuration overview of a drive assist apparatus 100 according to an embodiment of the present invention. The drive assist apparatus 100 is configured to include multiple drive assist performing apparatuses, namely, a lane-keeping assist apparatus 1, a preceding vehicle following apparatus 2, and a lane departure mitigation apparatus 3. The drive assist apparatus 100 can also include apparatuses that perform other types of driving assistance.

Figure 2:
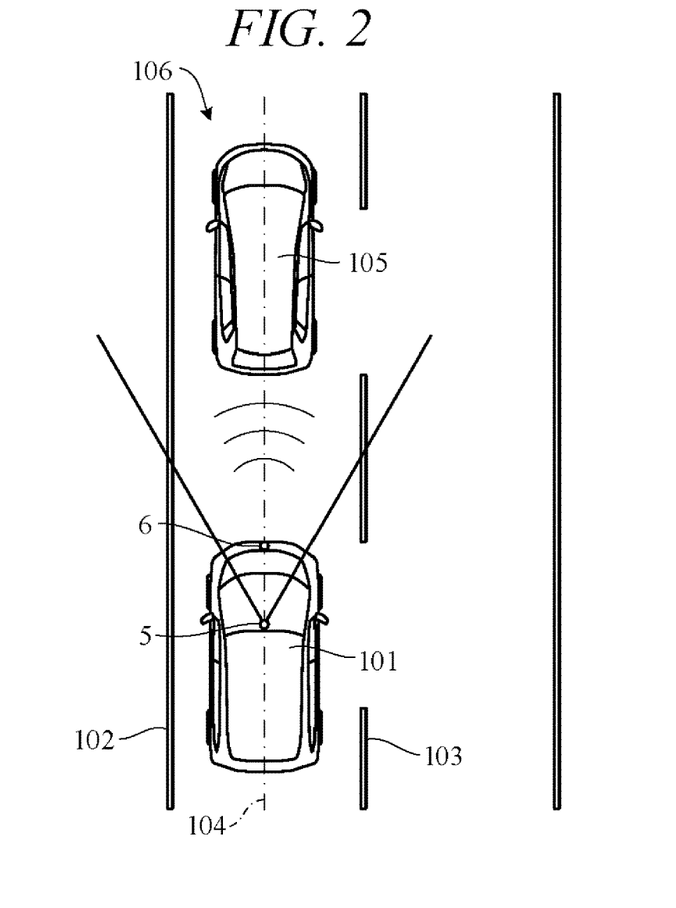
FIG. 2 is a diagram for explaining functions of apparatuses which constitute the drive assist apparatus.

FIG. 2 is a diagram for explaining functions of the apparatuses 1 to 3. As shown in FIG. 2, the lane-keeping assist apparatus 1 of a vehicle (subject vehicle) 101 uses an image from a camera 5 mounted on the subject vehicle 101 to detect lane lines (also called divider lines) 102 and 103 on the left and right sides of the subject vehicle 101. Then, provided that the vehicle 101 is running in a predetermined speed range, the lane-keeping assist apparatus 1 assists steering maneuvering by applying auxiliary steering torque to a steering mechanism (FIG. 3A) so that the vehicle 101 runs at predetermined position between the left and right lane lines 102 and 103, namely, for example, along (i.e., with its center positioned over) a center line 104 passing parallel to the lane lines 102 and 103 midway therebetween.

The preceding vehicle following apparatus 2 detects inter-vehicle distance to a preceding vehicle 105 based on a signal from the camera 5 or a radar 6 mounted on the subject vehicle 101. The preceding vehicle following apparatus 2 then controls the accelerator and/or brakes of the subject vehicle 101 to enable it to follow the preceding vehicle 105 while maintaining a predetermined inter-vehicle distance within a preset vehicle speed range. The lane departure mitigation apparatus 3 detects the lane lines 102 and 103 with the camera 5 and responds to likely departure of the subject vehicle 101 from a drive lane (road) 106 defined by the lines 102 and 103 by applying torque to the steering mechanism (FIG. 3A) larger than that applied by the lane-keeping assist apparatus 1 and thereby restoring the position of the subject vehicle 101 within the lane.

As shown in FIG. 1, the drive assist apparatus 100 comprises a main switch 10 and a pair of actuating switches 11 and 12. The switches 10 to 12 are constituted as operating members that turn ON when pressed by the operator after an ignition switch is turned ON, and are separately provided on or near a steering wheel, for example. The switches 10 to 12 turn OFF when operated to do so by the operator (by pressing again, for example). The switches 10 to 12 also turn OFF when the ignition switch is turned OFF.

The lane-keeping assist apparatus 1 or the preceding vehicle following apparatus 2 can be activated after the ignition switch is turned ON by operating the main switch 10 and thereafter operating the actuating switch 11 or 12. Specifically, the main switch 10 outputs a standby signal for enabling the actuating switches 11 and 12, and when the activating switch 11 or 12 is operated while the standby signal is active, the actuating switch 11 or 12 outputs an activation signal. Still more specifically, the lane-keeping assist apparatus 1 and preceding vehicle following apparatus 2 are put in standby state by operation of the main switch 10, and the lane-keeping assist apparatus 1 and the preceding vehicle following apparatus 2 are respectively activated from the standby state when the activating switch 11 is operated and when the activating switch 12 is operated. Differently from this, the lane departure mitigation apparatus 3 turns ON independently of the main switch 10 and actuating switches 11 and 12 when the ignition switch is turned ON.

By thus adopting a configuration by which the operator him- or her-self operates switches to select whether to activate the lane-keeping assist apparatus 1 and the preceding vehicle following apparatus 2, more than necessary intervention of the drive assist apparatus 100 in driving operations can be avoided to realize a good driving feel and ensure that the driver does not sense anything unnatural. On the other hand, in a case where the operator fails (e.g., forgets) to operate the switch of the lane-keeping assist apparatus 1 even though its operation is desirable because, for example, the vehicle 101 is wandering badly, the configuration described so far cannot readily perform optimum driving assistance. In view of this, the drive assist apparatus 100 according to this embodiment is further configured as set out below so as to enable optimum driving assistance even when switches have not been operated.

Figure 3A:
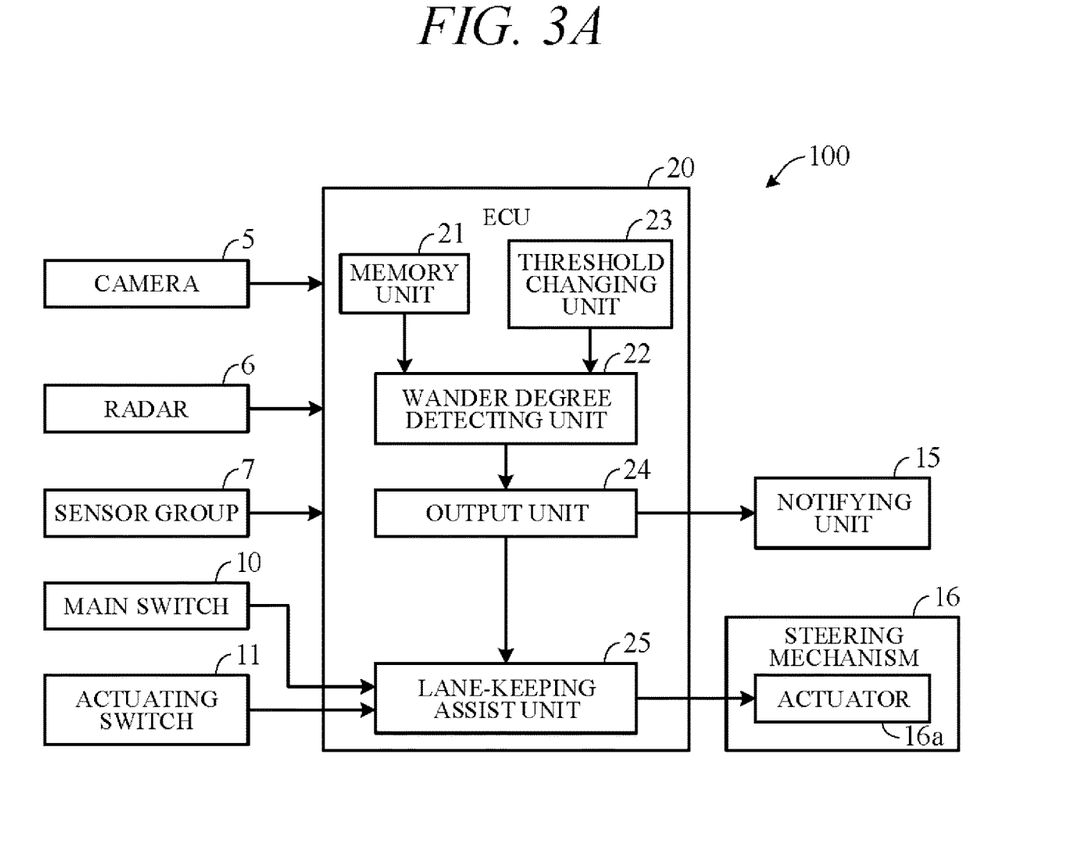
FIG. 3A is a block diagram showing a part of the drive assist apparatus according to the embodiment of the present invention, which relates mainly to a lane-keeping assist apparatus.

FIG. 3A is a block diagram showing a part of the configuration of the drive assist apparatus 100 according to the embodiment of the present invention, namely a part that relates mainly to the lane-keeping assist apparatus 1. As shown in FIG. 3A, the drive assist apparatus 100 comprises an ECU (Electronic Control Unit) 20. The camera 5, the radar 6, a sensor group 7, the main switch 10, the activating switch 11, a notifying unit 15, and a steering mechanism 16 are connected to the ECU 20.

The camera 5 is, for example, a front camera provided on the front of the vehicle to photograph forward of the vehicle and can be configured as a single lens camera having an image sensor such as a CCD or CMOS sensor or as a stereo camera. Image signals from the camera 5 are processed by an image recognition unit (not shown) provided in the ECU 20 to recognize lane lines and/or objects forward of the subject vehicle. Optionally, the camera 5 can actually be multiple cameras including a rear camera provided on the rear of the vehicle for photographing rearward of the vehicle and/or side cameras provided on opposite sides of the vehicle for photographing sideways of the vehicle.

The radar 6, which is provided on the front of the vehicle, is configured as a millimeter-wave radar or laser radar that transmits radio waves or light forward of the vehicle, receives radio waves or light reflected by objects (people or things), detects the objects, and detects distance to the objects from time measured to reception of reflected radio waves or light. Optionally, a configuration using a microwave radar, an infrared ray radar or an ultrasonic sensor can be adopted. Signals from the radar 6 are processed by a preceding vehicle recognition unit (not shown) provided in the ECU 20 to enable recognition of preceding vehicle position, inter-vehicle distance to preceding vehicle, speed relative to preceding vehicle, and the like.

The sensor group 7 includes various detection devices for detecting data corresponding to vehicle running state, such as, for example, a vehicle speed sensor, an acceleration sensor, a yaw rate sensor, and a GPS sensor (GPS signal unit) for measuring vehicle current position from signals received from GPS satellites. The sensor group 7 also includes various detection devices for detecting data corresponding to operator driving operations, such as, for example, an accelerator pedal sensor for detecting amount of accelerator pedal depression, a brake pedal sensor for detecting amount of brake pedal depression, and a steering sensor for detecting steering torque or steering angle. In addition, the sensor group 7 includes various detection devices for detecting external factors affecting the operator's field of vision, such as raindrops adhering to window glass, fog, wind force, brightness around vehicle, and road surface condition, and also includes in-cabin detection equipment such as a camera for detecting operator line-of-sight and/or expression.

In this specification "notifying unit 15" is a general designation for equipment configured to notify the operator of various data and information. Specifically, the notifying unit 15 is configured of a speaker for conveying sound information like voice messages and alarm sounds to the operator, and a display provided in front of an operator's seat for displaying information on a screen. The notifying unit 15 operates in response to control signals output from the ECU 20. In the present embodiment, the notifying unit 15 produces sound and/or visually displayed prompts advising operation of the switches 10 and 11, i.e., prompts advising activation of the lane-keeping assist apparatus 1 (activation prompts).

The steering mechanism 16 is configured to apply a steering angle corresponding to steering wheel operation to steered wheels and comprises an actuator 16a, such as an electric motor for assisting steering force. The actuator 16a is driven by a control signal output from the ECU 20 and applies auxiliary steering torque to a steering shaft (not shown) in one or the other of two opposite turning directions.

Figure 3B:
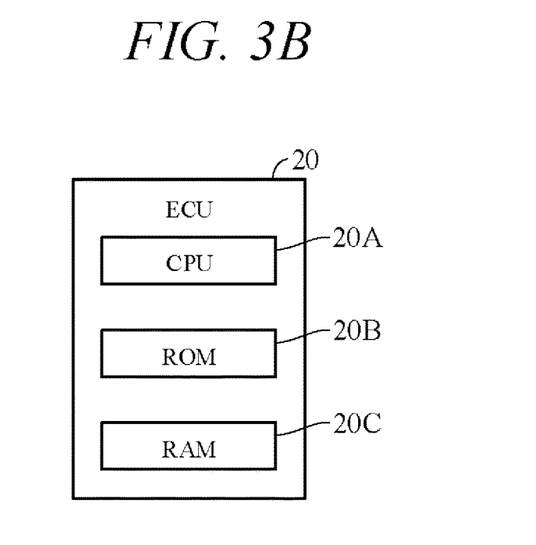
FIG. 3B is a block diagram showing a hardware configuration of an ECU of FIG. 3A.

FIG. 3B is a block diagram showing the hardware configuration of the ECU 20. The ECU 20 is constituted to include a computer comprising a CPU 20A, ROM 20B and RAM 20C, as shown in FIG. 3B, plus other peripheral circuits not shown in the drawing. As shown in FIG. 3A, the ECU 20 functionally comprises a memory unit 21, a wander degree detecting unit 22, a threshold changing unit 23, an output unit 24, and a lane-keeping assist unit 25. The CPU 20A provides the functions of the wander degree detecting unit 22, threshold changing unit 23, output unit 24, and lane-keeping assist unit 25. The ROM 20B, for example, provides the function of the memory unit 21.

After vehicle starting is commenced by turn-on of the ignition switch (current run), the memory unit 21 stores number (frequency) of operations of the switches 10 and 11, number of lane-keeping assist apparatus 1 activation prompts from the notifying unit 15, number of lane-keeping assist apparatus 1 activations, and other data regarding the current run (current run data). The memory unit 21 stores not only current run data but also run data after the preceding ignition turn-on, i.e., also stores data regarding the preceding run. For example, it stores data regarding the preceding run such as number (frequency) of operations of the switches 10 and 11, number of lane-keeping assist apparatus 1 activation prompts from the notifying unit 15, number of lane-keeping assist apparatus 1 activations, and time between preceding run completion and current run start. In addition to the preceding run data, the memory unit 21 can also store similar data regarding still earlier runs. Moreover, the memory unit 21 also stores data such as previously driven routes, number of times (frequency) each route driven and other driving history data, frequency of lane departure mitigation apparatus 3 operation, and so on.

The wander degree detecting unit 22 detects degree of vehicle wandering based on signals from the camera 5 and/or sensor group 7, and evaluates whether wander degree exceeds a threshold. For example, wander degree is defined as amount of vehicle departure from the center line recognized from a camera image, and the wander degree detecting unit 22 determines whether the recognized wander degree exceeds a threshold. Alternatively, it is possible to define change of vehicle running path detected from a signal from the yaw rate sensor and/or the acceleration sensor as wander degree and determine whether this wander degree exceeds a threshold, or to define number of times (frequency) of the vehicle approaching a lane line closer than a predetermined amount as wander degree or define number of times (frequency) of the vehicle running outside a lane line as wander degree, and determine whether one of these wander degrees exceeds a threshold. Determination of wander degree can also be performed based on position data acquired from the GPS sensor. For example, when a high resolution map including lane line type particulars is available, wander degree can be detected by identifying a location on the high resolution map using the GPS sensor and comparing white line data at the map location with actually measured white line data (comparing map and camera white lines). When the ECU 20 determines that wander degree exceeds the threshold, it decides that operation of the lane-keeping assist apparatus 1 is necessary.

The threshold changing unit 23 changes the threshold in the wander degree detecting unit 22 based on data from the camera 5 and/or sensor group 7 or on data stored in the memory unit 21. For example, data indicating lane line radius of curvature is acquired from a camera image and the threshold is increased in case of successive corners or similar. The reason for this is that when driving on a road with successive corners, the driver sometimes deliberately crosses over lane lines, so the threshold is therefore raised to prevent wandering of greater than the predetermined level being determined in such a case. Also possible is to enable the threshold changing unit 23 to acquire from the sensor group 7 data indicating weather conditions such as rain and fog and/or data indicating brightness conditions around the vehicle that differ between day driving and night driving, i.e., data indicating degree of visibility outside the vehicle, and to lower the threshold so as to boost sensitivity of wander determination in response to increasing need for operation of the lane-keeping assist apparatus 1 with worsening visibility. This control can be prohibited in specified areas. Areas in which drivers are likely to have strong maneuver and driving preferences, like race circuits, for example, can be designated control prohibited areas.

The threshold changing unit 23 can be enabled to acquire data stored in the memory unit 21 regarding number (frequency) of lane-keeping assist apparatus 1 activation prompts given during current run, preceding run and/or earlier runs and to increase the threshold with increasing number (frequency) of the prompts, which is advisable because the driver may be annoyed by these prompts. In addition, the threshold changing unit 23 can be enabled acquire data stored in the memory unit 21 regarding vehicle driving history around the current location and to decrease the threshold value when no history exists or the number of driving instances is fewer than a predetermined number, which is advisable because the lane-keeping assist apparatus 1 should be promptly activated to give assistance when driving on unfamiliar roads. Moreover, it is possible to lower the threshold with increasing vehicle speed, which is advisable because prompt activation of lane-keeping assist apparatus 1 becomes increasingly desirable at faster speeds.

The threshold changing unit 23 can be enabled to change the threshold with consideration to data stored in the memory unit 21 regarding frequency of operation of the lane departure mitigation apparatus 3. Need to operate the lane-keeping assist apparatus 1 can be considered to increase in proportion as frequency of operation of the lane departure mitigation apparatus 3 increases. Therefore, the threshold can be decreased in proportion as the frequency of operation the lane departure mitigation apparatus 3 is higher. Another possibility is not to change the threshold but for the wander degree detecting unit 22 to determine presence of vehicle wander immediately upon operation of the lane departure mitigation apparatus 3.

When the wander degree detecting unit 22 determines that wander degree exceeds the threshold, the output unit 24 outputs a control signal to the notifying unit 15. In response, the notifying unit 15 sounds and/or displays a prompt to the operator advising operation of the switches 10 and 11 (an activation prompt). When the operator turns on the switches 10 and 11 upon receiving the prompt from the notifying unit 15, an activation signal is output to the lane-keeping assist unit 25 to activate the lane-keeping assist apparatus 1 (FIG.

1). Optionally, it is possible when the wander degree detecting unit 22 determines that wander degree exceeds the threshold for the output unit 24 to output an activation signal to the lane-keeping assist unit 25, in addition to outputting a control signal to the notifying unit 15, or instead of outputting a control signal to the notifying unit 15.

Upon establishment of predetermined operating conditions after it receives the activation signal from the output unit 24, the lane-keeping assist unit 25 performs lane-keeping assist control. Specifically, the predetermined operating conditions are that left and right lane lines have been recognized based on image signals from the camera 5, that the subject vehicle is running in a predetermined speed range (e.g., between 65 km/h and 100 km/h, inclusive), and that all winkers are inoperative, and when these conditions are established, lane-keeping assist capability is enabled and the lane-keeping assist unit 25 performs lane-keeping assist control. When legal speed limits, designated speed limits or the like stipulated by laws and regulations change, the upper and lower speeds of the aforesaid speed range can be suitably changed accordingly, and different values can also be set for individual countries.

Figure 4:
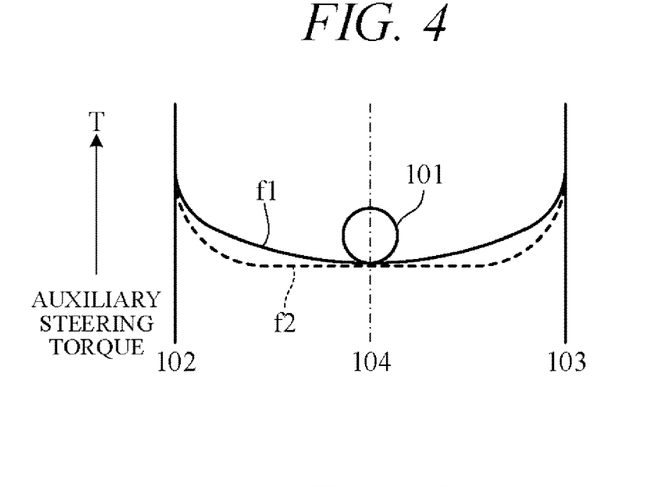
FIG. 4 is a diagram showing an example of assist characteristics of the lane-keeping assist apparatus according to the embodiment of the present invention.

The lane-keeping assist unit 25 performs lane-keeping assist control for outputting control signals to the actuator 16a (electric motor) of the steering mechanism 16 based on predefined assist characteristics. FIG. 4 is a diagram showing an example of the assist characteristics, which indicates magnitude of auxiliary steering torque T applied to the actuator 16a in accordance with position of the subject vehicle 101 between the left and right lane lines 102 and 103. As indicated by characteristic curve f1 (solid line) in FIG. 4, auxiliary steering torque T is minimum (e.g., 0) when the subject vehicle 101 is positioned on the center line 104 and gradually increases with departure from the center line 104. As a result, steering torque is assisted to keep the vehicle running along the center line 104.

Characteristic curve f2 (broken line) in FIG. 4 is another example of the assist characteristics. In characteristic curve f2, auxiliary steering torque T is smaller near the center line 104 than in characteristic curve f1 and degree of intervention in operator steering is therefore smaller. By defining multiple assist characteristics like f1 and f2 in this way, characteristics can be selected in accordance with circumstances.

Figure 5:
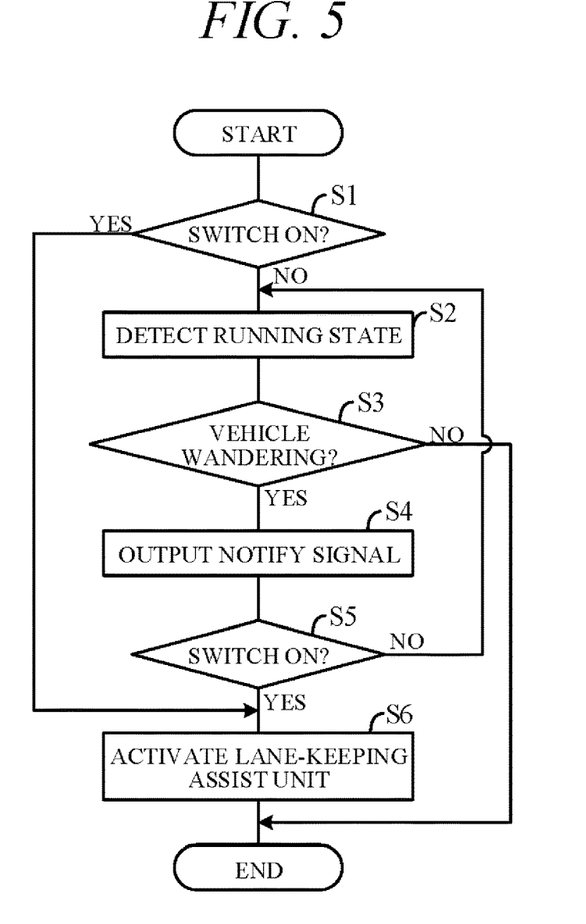
FIG. 5 is a flowchart showing an example of processing performed by the ECU of FIG. 3A.

FIG. 5 is a flowchart showing an example of processing performed by the ECU 20 (CPU 20A) in accordance with a program stored in the ROM 20B in advance, namely, processing up to activation of the lane-keeping assist apparatus 1. The processing shown in this flowchart is, for example, started when the ignition switch is turned ON and repeated at regular intervals. First, in S1 (S: processing Step), whether the main switch 10 and the activating switch 11 are both turned ON is determined. When neither the switch 10 nor the switch 11 is turned ON, or one of the switches 10 and 11 is not turned ON, the result in S1 is NO and the program goes to S2, and when the result is YES, the program goes to S6.

In S2, current vehicle running state is detected based on signals from the camera 5, radar 6 and sensor group 7. Next, in S3, whether vehicle wandering is present according to the processing by the wander degree detecting unit 22, i.e., whether wander degree exceeds the threshold, is determined. At this time, the threshold is appropriately changed in accordance with running state and the like by processing in the threshold changing unit 23. When the result in S3 is YES, the program goes to S4, and when the result in S3 is NO, the program is terminated because activation of the lane-keeping assist apparatus 1 is not necessary.

In S4, the output unit 24 processes and outputs a notify signal to the notifying unit 15. As a result, the notifying unit 15 operates to produce an activation prompt advising the operator to operate the switches 10 and 11. Next, in S5, whether the operator operated the switches 10 and 11 is determined. When the result in S5 is YES, the program goes to S6, and when NO, returns to S2. The notifying unit 15 produces an activation prompt every time the output unit 24 outputs a notify signal, but the operator might think it bothersome if continuously prompted until operating the switches 10 and 11. In view of this, an arrangement can be adopted that sets a limit on the number of notify signal outputs and stops giving activation prompts when the limit is reached.

In S6, the output unit 24 processes and outputs an activation signal to the lane-keeping assist unit 25. As a result, the lane-keeping assist apparatus 1 is activated. Thereafter, upon establishment of the aforesaid predetermined operating conditions, the lane-keeping assist unit 25 performs processing to implement lane-keeping assist control whereby auxiliary steering torque T is applied to the actuator 16a in accordance with predetermined assist characteristics (FIG. 4) so as to keep the subject vehicle 101 running along the center line 104. The lane-keeping assist apparatus 1 is turned OFF later when the switches 10 and 11 are turned OFF or when the ignition switch is turned OFF.

Thus in the present embodiment, when the switches 10 and 11 for activating the lane-keeping assist apparatus 1 are OFF, wandering of the vehicle is evaluated and if wandering is affirmed, the operator is given an activation prompt. As a result, the operator can, for example, easily notice that he or she forgot to operate the switches 10 and 11, and then, if so inclined, put the lane-keeping assist apparatus 1 into operation so that the drive assist apparatus 100 can perform optimum driving assistance.

In a case where processing performed by the lane-keeping assist unit 25 applies auxiliary steering torque, the assist characteristics can optionally be selected in accordance with the activation pattern of the lane-keeping assist apparatus 1. For example, it is possible to apply auxiliary steering torque based on characteristic curve f1 of FIG. 4 when the lane-keeping assist apparatus 1 operates without giving an activation prompt (S1→S6) and apply auxiliary steering torque based on characteristic curve f2 of FIG. 4 when the lane-keeping assist apparatus operates after giving an activation prompt (S5→S6).

Figure 6:
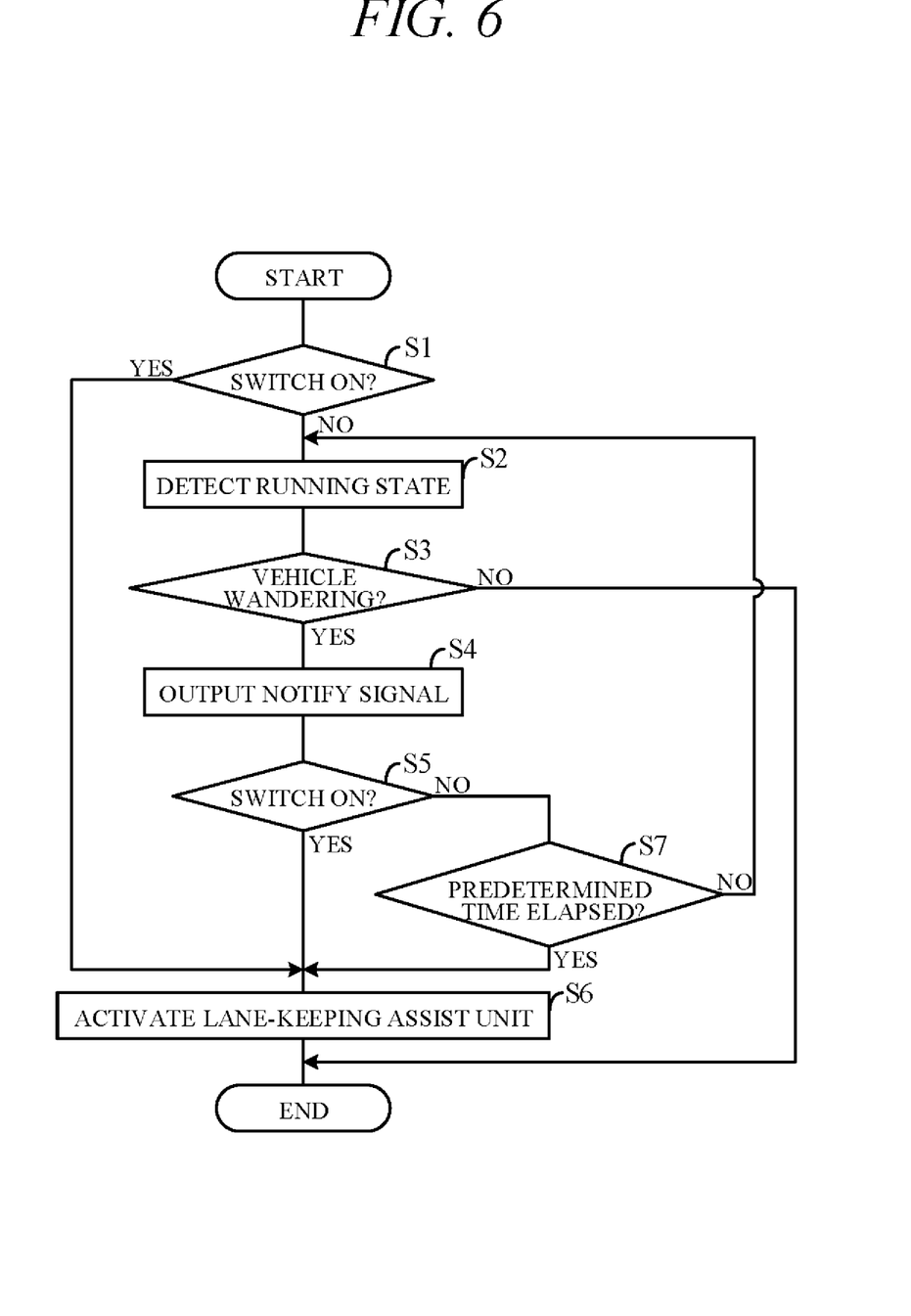
FIG. 6 is a flowchart showing a modified example of FIG. 5.

FIG. 6 is a modified version of the flowchart of FIG. 5. Steps that perform the same processing as in FIG. 5 are assigned like symbols in FIG. 6. In the flowchart of FIG. 6, if, after output of a notify signal to the notifying unit 15 in S4, the switches 10 and 11 are determined in S5 not to be turned ON, the program goes to S7. In S7, whether a predetermined time elapsed is determined. Namely, it is determined whether a predetermined time set, say, in the range of from around several seconds to several tens of seconds elapsed between the operator noticing the activation prompt from the notifying unit 15 and operating the switches 10 and 11. When the result in S7 is YES the program goes to S6, and when NO, returns to S2. Optionally, in S7, instead of determining elapse of the predetermined time, or in addition to determining elapse of the predetermined time, whether the number of notify signal outputs reached a predetermined number can be determined.

Thus, even when the switches 10 and 11 are inoperative, the lane-keeping assist apparatus 1 can be activated by an activation signal processed and output by the output unit 24. Therefore, the lane-keeping assist apparatus 1 can easily shift to activated state without the operator having to operate switches after an activation prompt is given. In this case, the operator's feeling of unnaturalness owing to the automatic activation of the lane-keeping assist apparatus 1 is likely to be slight because of the prompts received beforehand. Optionally, when the switches have not been operated within the predetermined time, the notifying unit 15 can announce that the lane-keeping assist apparatus 1 is to be automatically activated. When the lane-keeping assist apparatus 1 is automatically activated, the lane-keeping assist unit 25 preferably applies auxiliary steering torque based on different assist characteristics (e.g., based on characteristic curve f2 of FIG. 4) from those when the lane-keeping assist apparatus 1 is activated by switch operation.

Figure 7:
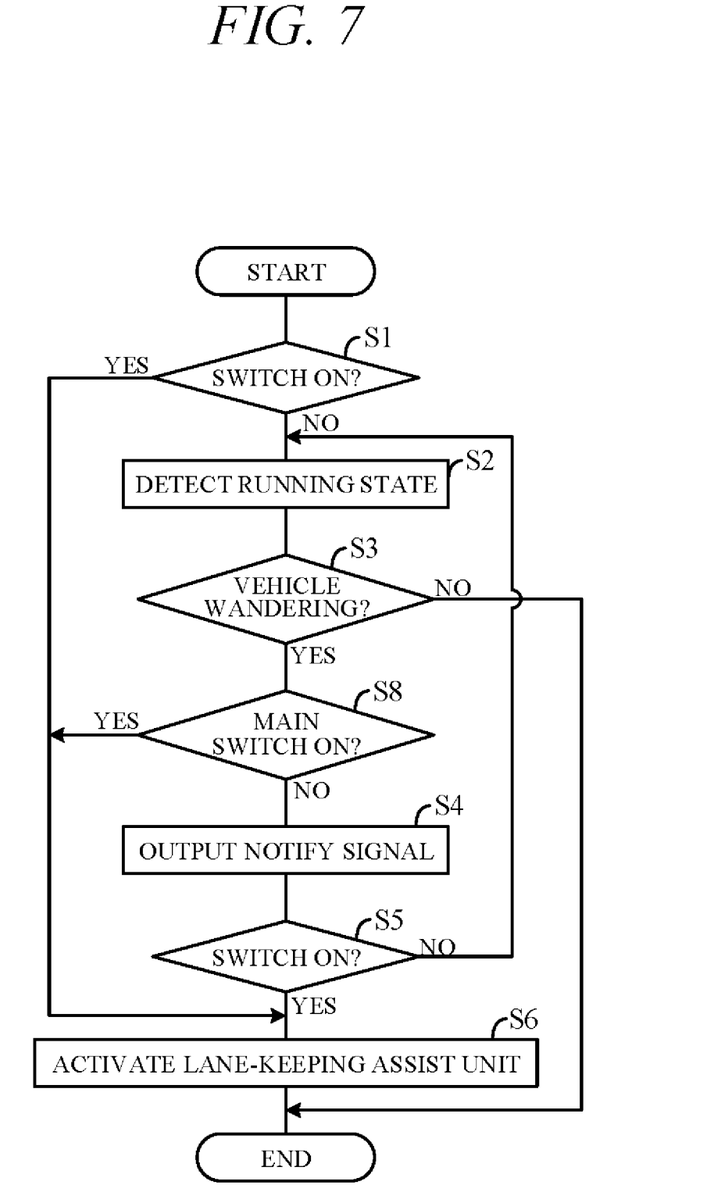
FIG. 7 is a flowchart showing another modified example of FIG. 5.

FIG. 7 is another modified version of the flowchart of FIG. 5. Steps that perform the same processing as in FIG. 5 are assigned like symbols in FIG. 7. In the flowchart of FIG. 7, after vehicle wandering is affirmed in S3, the program goes to S8. In S8, whether the main switch 10 is ON is determined, in other words, even in a case where the result in S1 was NO because the switches 10 and 11 were not both ON, whether only the switch 10 is ON and the lane-keeping assist apparatus 1 is in standby state is determined. When the result in S8 is YES, the program goes to S6, and when NO, goes to S4.

With this configuration, the lane-keeping assist apparatus 1 can be activated by an activation signal processed and output by the output unit 24, even though the activating switch 11 is inoperative. Therefore, in a case such as when the operator operates only switch 10 but forgets to operate the activating switch 11, so that the lane-keeping assist apparatus 1 does not operate even though the operator's intention is for it to operate, the lane-keeping assist apparatus 1 can be automatically activated in line with the operator's intention. Since the probability of the operator desiring activation of the lane-keeping assist apparatus 1 is high in such a case, the operator's feeling of unnaturalness owing to no-prompt (prompt-free) automatic activation of the lane-keeping assist apparatus 1 is likely to be slight.

Figure 8:
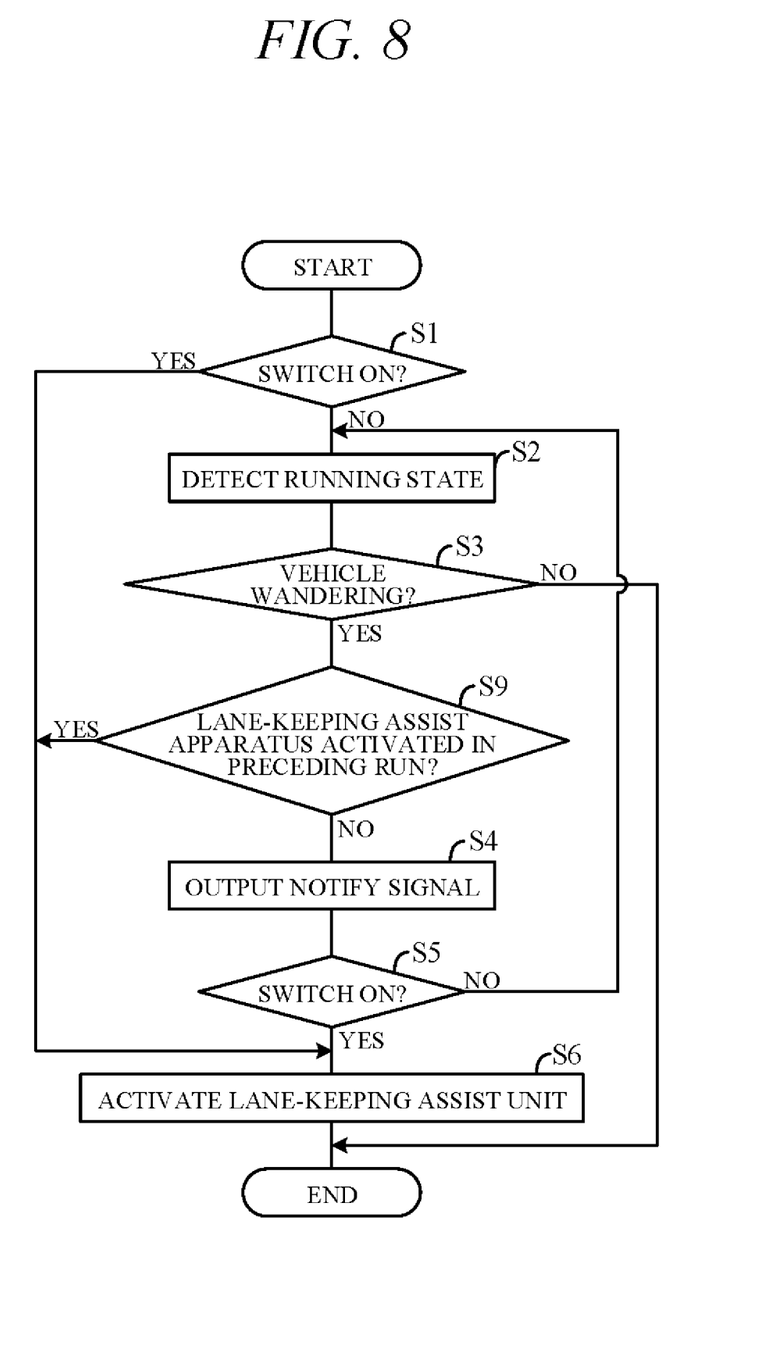
FIG. 8 is a flowchart showing another modified example of FIG. 5.

FIG. 8 is another modified version of the flowchart of FIG. 5. Steps that perform the same processing as in FIG. 5 are assigned like symbols in FIG. 8. In the flowchart of FIG. 8, after vehicle wandering is affirmed in S3, the program goes to S9. In S9, whether the lane-keeping assist apparatus 1 was activated in the preceding run is determined based on data regarding the preceding run stored in the memory unit 21. When the result in S9 is YES, the program goes to S6, and when NO, goes to S4. Optionally, the determination in S9 can be made NO also when preceding run data need not be carried over (are irrelevant) because time between preceding run completion and current run start is equal to or longer than a predetermined time.

Also in this case, as in the examples of FIGS. 6 and 7, the lane-keeping assist apparatus 1 can be activated by an activation signal processed and output by the output unit 24, even though the activating switch 11 is inoperative. The configuration of FIG. 8 takes into account the fact that when the lane-keeping assist apparatus 1 is once turned OFF owing to the vehicle having parked at an expressway drive-in, for example, the operator is highly likely to want the lane-keeping assist apparatus 1 to turn back ON when driving is resumed. Therefore, good driving assistance in line with the intention of the operator can be continued by automatically re-activating the lane-keeping assist apparatus 1 without giving prompts, i.e., without prompting the vehicle operator to operate the switches 10 and 11.

The present embodiment can achieve advantages and effects such as the following:

(1) The drive assist apparatus 100 comprises the lane-keeping assist apparatus 1 for applying auxiliary steering torque to the steering mechanism 16 to keep the vehicle running at a predetermined position between the left and right lane lines (e.g., a position along a center line), the activating switch 11 operated by the vehicle operator for outputting the activation signal to activate the lane-keeping assist apparatus 1 (initiate operation of the lane-keeping assist apparatus 1), the wander degree detecting unit 22 for determining need to operate the lane-keeping assist apparatus 1, i.e., determine whether the vehicle is wandering, and the output unit 24 for outputting a notify signal prompting the operator to operate the activating switch 11 to the notifying unit 15 or outputting an activation signal to the lane-keeping assist unit 25 when the activating switch 11 is inoperative and the wander degree detecting unit 22 determines that operation of the lane-keeping assist apparatus 1 is necessary (FIGS. 1 and 3A).

By thus adopting a configuration that outputs a notify signal when the wander degree detecting unit 22 determines that operation of the lane-keeping assist apparatus 1 is necessary, the operator can easily notice, for example, that he or she forgot to operate the switch 11, and the lane-keeping assist apparatus 1 can be operated to reflect the intention of the operator. Further, owing to the adoption of a configuration that outputs the activation signal to the lane-keeping assist apparatus 1, the lane-keeping assist apparatus 1 can be automatically operated to perform optimum driving assistance when the probability of the operator desiring operation of the lane-keeping assist apparatus 1 is high.

(2) The drive assist apparatus 100 comprises the camera 5 and sensor group 7 for detecting vehicle wander degree relative to lane lines as a reference (FIG. 3A). The wander degree detecting unit 22 determines that activation of the lane-keeping assist apparatus 1 is necessary when wander degree (departure from center line or the like) detected by the camera 5 and sensor group 7 exceeds the threshold. Owing to determination of need to operate the lane-keeping assist apparatus 1 based on vehicle wander degree in this manner, need to operate the lane-keeping assist apparatus 1 can be optimally determined and highly useful data (information) can be conveyed to the operator.

(3) The drive assist apparatus 100 comprises the sensor group 7 and the memory unit 21 for acquiring at least one set of data from among data indicating lane line radius of curvature, data indicating degree of visibility outside the vehicle, data indicating frequency of notify signal output, and data indicating vehicle driving history around current location, and the threshold changing unit 23 for changing the threshold in the wander degree detecting unit 22 in accordance with these acquired data (FIG. 3A). Since the wander determination threshold therefore changes in accordance with various circumstances, wander determination can be accurately performed and activation prompts advising activation of the lane-keeping assist apparatus 1 can be given with optimum timing.

(4) The drive assist apparatus 100 further comprises the lane departure mitigation apparatus 3 for preventing or mitigating departure of the vehicle from the drive lane 106 by applying torque to the steering mechanism 16 larger than that applied by the lane-keeping assist apparatus 1 (FIG. 1). The wander degree detecting unit 22 can determine need for operation of the lane-keeping assist apparatus 1 from vehicle wander degree detected by the camera 5, sensor group 7 and the like, and also from frequency of operation of the lane departure mitigation apparatus 3. For example, need for operation of the lane-keeping assist apparatus 1 can be determined to be higher in proportion as operation frequency of the lane departure mitigation apparatus 3 is higher, and the threshold of the wander degree detecting unit 22 can be decreased accordingly. As a result, activation prompts are announced earlier without delay and can therefore be optimally timed.

(5) The output unit 24 outputs a notify signal when the activating switch 11 is inoperative and operation of the lane-keeping assist apparatus 1 is determined necessary by the wander degree detecting unit 22, and thereafter outputs an activation signal if the vehicle operator does not operate the activating switch 11 within the predetermined time after the notify signal was output (FIG. 6). This enables activation of the lane-keeping assist apparatus 1 even when the activating switch 11 is inoperative. The lane-keeping assist apparatus 1 can therefore easily shift to activated state without the operator having to operate switches after an activation prompt is given.

(6) In addition to the activating switch 11, the drive assist apparatus 100 separately comprises the main switch 10 to be operated by the vehicle operator in order to output a standby signal enabling operation of the actuating switch 11 (FIG. 3A). When the activating switch 11 is inoperative and operation of the lane-keeping assist apparatus 1 is determined necessary by the wander degree detecting unit 22, the output unit 24 can, on condition of a standby signal being output from the main switch 10, output an activation signal without outputting a notify signal (FIG. 7). Therefore, in a case such as when the vehicle operator operates only the main switch 10 and forgets to operate the activating switch 11, so that the lane-keeping assist apparatus 1 does not operate notwithstanding that the operator desires operation of the lane-keeping assist apparatus 1, the lane-keeping assist apparatus 1 can be automatically activated.

(7) The drive assist apparatus 100 comprises the memory unit 21 for storing data indicating whether or not the lane-keeping assist apparatus 1 activated previously before vehicle starting, i.e., in the preceding run (FIG. 3A). When the activating switch 11 is inoperative, operation of the lane-keeping assist apparatus 1 is determined necessary by the wander degree detecting unit 22 and activation history of the lane-keeping assist apparatus 1 in the preceding run is stored in the memory unit 21, the output unit 24 outputs an activation signal without outputting a notify signal (FIG. 8). Therefore, when the lane-keeping assist apparatus 1 is once turned OFF owing to the vehicle having parked at an expressway drive-in, for example, in which case the operator can be presumed to desire the lane-keeping assist apparatus 1 to be turned ON again when vehicle driving is thereafter resumed, the lane-keeping assist apparatus 1 can be automatically activated without announcing a prompt.

In the foregoing embodiment, the activating switch 11 is provided as an operating member (the first a) for outputting an activation signal for activating the lane-keeping assist apparatus 1, and the main switch 10 is provided as the second operating member for outputting the standby signal for enabling operation of the activating switch 11. And a configuration is adopted that outputs an activation command to the lane-keeping assist apparatus 1 by operating both of the switches 10 and 11 (FIG. 5), but it is optionally possible to omit the main switch 10 and output the activation command solely by operation of the activating switch 11. In the foregoing embodiment, vehicle wander degree relative to lane lines as a reference is detected using the camera 5, sensor group 7 and the like as wander detection members, and operation of the lane-keeping assist apparatus 1 is determined to be necessary when detected wander degree exceeds a threshold, but the configuration of the wander degree detecting unit is not limited to that of the wander degree detecting unit 22, and necessity of lane-keeping assist apparatus operation can instead by determined based on other than wander degree. Determining whether or not the lane-keeping assist apparatus 1 needs to be operated corresponds to determining whether to enable or disable the lane-keeping assist apparatus 1, and activation of the lane-keeping assist apparatus 1 corresponds to enabling the lane-keeping assist apparatus. In the aforesaid embodiment, a configuration is adopted in which the threshold changing unit 23 changes the wander determination threshold in accordance with data acquired from the camera 5, sensor group 7, memory unit 21 and other data acquisition sources, but the data acquisition sources are not limited to this configuration.

The above embodiment can be combined as desired with one or more of the above modifications. The modifications can also be combined with one another.

According to the present invention, since at least one of the notify signal prompting the operator to operate the operating members and the activation signal is output when the operating members for outputting the activation signals for activating the lane-keeping assist apparatus are inoperative and it is determined that operation of the lane-keeping assist apparatus is necessary, it is possible to enable optimum driving assistance even when the operating members are inoperative.

Above, while the present invention has been described with reference to the preferred embodiments thereof, it will be understood, by those skilled in the art, that various changes and modifications may be made thereto without departing from the scope of the appended claims.

What is claimed is:

1. A drive assist apparatus, comprising:
   an actuator configured to be driven by a control signal and apply an auxiliary steering torque to a steering mechanism mounted on a vehicle;
   an ignition switch configured to be operated by an operator of the vehicle to start the vehicle;
   a manual switch configured to be operated by the operator to output an activation signal for activating a lane-keeping assist function for assisting the vehicle in running at a predetermined position between lane lines along the lane lines by outputting the control signal to the actuator to apply the auxiliary steering torque based on a characteristic predefined in accordance with a position of the vehicle between the lane lines, the manual switch being operable only after the vehicle is started through the ignition switch; and
   a CPU operating the lane-keeping assist function,
   wherein, in a state where the manual switch is activated, the lane-keeping assist function is activated by the activation signal output from the manual switch, and the CPU operates the lane-keeping assist function by:
   outputting the control signal to the actuator when the lane-keeping assist function is activated, and
   wherein, in a state where the manual switch is not activated, the CPU operates the lane-keeping assist function by:
   determining whether operation of the lane-keeping assist function is necessary;
   outputting a notify signal for prompting the operator to operate the manual switch when the manual switch is not activated and it is determined that operation of the lane-keeping assist function is necessary; and outputting the activation signal for activating the lane-keeping assist function contrary to the state where the manual switch is not activated when the manual switch is not activated in response to the notify signal and it is continuously determined that operation of the lane-keeping assist function is necessary for a predetermined time period after output of the notify signal.

2. The drive assist apparatus according to claim 1, wherein the CPU detects a wander degree of the vehicle relative to the lane lines, and determines that operation of the lane-keeping assist function is necessary when the wander degree exceeds a threshold.

3. The drive assist apparatus according to claim 2, wherein the CPU acquires at least one of data indicating a radius of curvature of the lane lines, data indicating a degree of visibility outside the vehicle, data indicating a frequency of output of the notify signal, and data indicating a driving history around a current location of the vehicle, and changes the threshold based on the acquired data.

4. The drive assist apparatus according to claim 2, wherein the CPU operates a lane departure mitigation function for mitigating departure of the vehicle from a drive lane defined by the lane lines by outputting the control signal to the actuator to apply the auxiliary steering torque larger than applied for the lane-keeping assist function, and determines whether operation of the lane-keeping assist function is necessary based on the wander degree detected and a frequency of operation of the lane departure mitigation function.

5. The drive assist apparatus according to claim 1, wherein
the manual switch is a first switch, and
the drive assist apparatus further comprising:
a second switch configured to be operated by the operator to output a standby signal for enabling operation of the first switch,
wherein the CPU outputs the activation signal instead of outputting the notify signal on condition of the standby signal being output by the second switch when the first switch is not activated and it is determined that operation of the lane-keeping assist function is necessary.

6. The drive assist apparatus according to claim 5, wherein
the first switch and the second switch are separately provided on or near a steering wheel.

7. The drive assist apparatus according to claim 5, wherein
the first switch and the second switch are turned OFF when the ignition switch is turned OFF.

8. The drive assist apparatus according to claim 1, further comprising:
a memory;
wherein the memory stores information whether the lane-keeping assist function was activated in a preceding run before vehicle starting, and
the CPU outputs the activation signal instead of outputting the notify signal when the manual switch is not activated, it is determined that operation of the lane-keeping assist function is necessary, and information that the lane-keeping assist function was activated in the preceding run is stored in the memory.

9. The drive assist apparatus according to claim 1, wherein
a magnitude of the auxiliary steering torque is a minimum when the vehicle is running at the predetermined position and is increasing with departure from the predetermined position.

10. The drive assist apparatus according to claim 1, wherein
the characteristic includes: a first characteristic curve; and a second characteristic curve in which the auxiliary steering torque is smaller near the predetermined position than in the first characteristic curve, wherein
the CPU operates the lane-keeping assist function by:
outputting the control signal to the actuator to apply the auxiliary steering torque based on the first characteristic curve when the lane-keeping assist function is activated in the state where the manual switch is activated;
while outputting the control signal to the actuator to apply the auxiliary steering torque based on the second characteristic curve when the lane-keeping assist function is activated in the state where the manual switch is not activated.

11. A drive assist apparatus, comprising:
an actuator configured to be driven by a control signal and apply an auxiliary steering torque to a steering mechanism mounted on a vehicle;
an ignition switch configured to be operated by an operator of the vehicle to start the vehicle;
a manual switch configured to be operated by the operator to output an activation signal for activating a lane-keeping assist function for assisting the vehicle in running at a predetermined position between lane lines along the lane lines by outputting the control signal to the actuator to apply the auxiliary steering torque based on a characteristic predefined in accordance with a position of the vehicle between the lane lines, the manual switch being operable only after the vehicle is started through the ignition switch; and
a CPU configured to function as:
a lane-keeping assist apparatus configured to operate the lane-keeping assist function,
wherein, in a state where the manual switch is activated, the lane-keeping assist function is activated by the activation signal output from the manual switch, and the lane-keeping assist apparatus operates the lane-keeping assist function by outputting the control signal to the actuator when the lane-keeping assist function is activated, and
wherein, in a state where the manual switch is not activated, the lane-keeping assist apparatus operates the lane-keeping assist function by:
determining whether operation of the lane-keeping assist apparatus is necessary;
outputting a notify signal for prompting the operator to operate the manual switch when the manual switch is not activated and it is determined that operation of the lane-keeping assist function is necessary by the determining unit; and
outputting the activation signal for activating the lane-keeping assist function contrary to the state where the manual switch is not activated when the manual switch is not activated in response to the notify signal and it is continuously determined that operation of the lane-keeping assist function is necessary for a predetermined time period after output of the notify signal.

12. The drive assist apparatus according to claim 11, wherein:

the lane-keeping assist apparatus detects a wander degree of the vehicle relative to the lane lines, and determines that operation of the lane-keeping assist function is necessary when the wander degree exceeds a threshold.

13. The drive assist apparatus according to claim 12, wherein:
the lane-keeping assist apparatus acquires at least one of data indicating a radius of curvature of the lane lines, data indicating a degree of visibility outside the vehicle, data indicating a frequency of output of the notify signal, and data indicating a driving history around a current location of the vehicle, and changes the threshold based on the data acquired.

14. The drive assist apparatus according to claim 12, wherein the CPU is configured to further function as:
a lane departure mitigation apparatus configured to operate a lane departure mitigation function for mitigating departure of the vehicle from a drive lane defined by the lane lines by outputting the control signal to the actuator to apply the auxiliary steering torque larger than applied for the lane-keeping assist function,
wherein the lane-keeping assist apparatus determines whether operation of the lane-keeping assist function is necessary based on the wander degree detected and a frequency of operation of the lane departure mitigation function.

15. The drive assist apparatus according to claim 11, wherein
the manual switch is a first switch, and
the drive assist apparatus further comprising:
a second switch configured to be operated by the operator to output a standby signal for enabling operation of the first switch,
wherein the lane-keeping assist apparatus outputs the activation signal instead of outputting the notify signal on condition of the standby signal being output by the second switch when the first switch is not activated and it is determined that operation of the lane-keeping assist function is necessary.

16. The drive assist apparatus according to claim 11, further comprising:
a memory;
wherein the memory stores information whether the lane-keeping assist function was activated in a preceding run before vehicle starting,
wherein the lane-keeping assist apparatus outputs the activation signal instead of outputting the notify signal when the manual switch is not activated, it is determined that operation of the lane-keeping assist function is necessary, and information that the lane-keeping assist function was activated in the preceding run is stored in the memory.

17. A drive assist method for assisting driving of a vehicle having a lane-keeping assist apparatus configured to apply an auxiliary steering torque to a steering mechanism mounted on the vehicle so that the vehicle runs at a predetermined position between lane lines along the lane lines by applying the auxiliary steering torque based on a characteristic predefined in accordance with a position of the vehicle between the lane lines,
the vehicle further having: an ignition switch configured to be operated by an operator of the vehicle to start the vehicle; and a manual switch configured to be operated by the operator to output an activation signal for activating the lane-keeping assist apparatus, the manual switch being operable only after the vehicle is started through the ignition switch,
wherein, in a state where the manual switch is activated, the lane-keeping assist apparatus is activated by the activation signal output from the manual switch, and
wherein, in a state where the manual switch is not activated, the method comprises:
determining whether operation of the lane-keeping assist apparatus is necessary;
outputting a notify signal for prompting the operator to operate the manual switch when the manual switch is not activated and it is determined that operation of the lane-keeping assist apparatus is necessary; and
outputting the activation signal for activating the lane-keeping assist apparatus contrary to the state where the manual switch is not activated when the manual switch is not activated in response to the notify signal and it is continuously determined that operation of the lane-keeping assist apparatus is necessary for a predetermined time period after output of the notify signal.

* * * * *